United States Patent [19]
Chou

[11] Patent Number: 6,135,019
[45] Date of Patent: Oct. 24, 2000

[54] FILTER ASSEMBLY FOR A BLENDER

[76] Inventor: Shang-Wei Chou, 10584 Santa Monica Blvd., Apt. 211, Los Angeles, Calif. 90025

[21] Appl. No.: 09/504,289

[22] Filed: Feb. 15, 2000

[51] Int. Cl.[7] .............................. A23N 1/00; B01F 7/24; B02C 15/00; B04B 5/10

[52] U.S. Cl. .............................. 99/513; 99/501; 366/205; 366/314

[58] Field of Search .............................. 99/348, 501–503, 99/510–513; 210/360.1, 380.1; 241/37.5, 92, 282.1, 282.2, 82.3; 366/205, 314, 264, 266, 318

[56] References Cited

U.S. PATENT DOCUMENTS

| | | | |
|---|---|---|---|
| 2,311,379 | 2/1943 | Gillanders | 99/512 |
| 2,845,971 | 8/1958 | Cordero | 99/512 |
| 3,892,365 | 7/1975 | Verdum | 241/282.1 X |
| 4,183,293 | 1/1980 | Arao et al. | 99/513 X |
| 4,240,338 | 12/1980 | McClean . | |
| 4,345,517 | 8/1982 | Arao et al. | 99/511 |
| 4,506,601 | 3/1985 | Ramirez et al. | 99/511 |
| 4,614,153 | 9/1986 | Kurome et al. | 99/513 X |
| 4,681,031 | 7/1987 | Austad | 99/511 |
| 4,700,621 | 10/1987 | Elger | 99/513 X |
| 5,222,430 | 6/1993 | Wang | 99/511 X |
| 5,421,248 | 6/1995 | Hsu | 99/511 X |
| 5,433,144 | 7/1995 | Lee | 99/512 |
| 5,479,851 | 1/1996 | McClean et al. | 99/513 X |
| 5,636,923 | 6/1997 | Nejat-Bina . | |
| 5,662,032 | 9/1997 | Baratta . | |
| 5,690,021 | 11/1997 | Grey . | |

FOREIGN PATENT DOCUMENTS 1145143   6/1976   France .

*Primary Examiner*—Timothy Simone
*Attorney, Agent, or Firm*—Thomas I. Rozsa; Tony D. Chen; Jerry Fong

[57] ABSTRACT

A filter assembly for a blender including a hollow cylindrical filter member, a main cap member, and a plunger assembly. The main cap member encloses a top opening of the blender such that the filter member is positioned within the container of the blender and surrounds the blade member located at the base of the container. A pusher plate of the plunger assembly forces the fruit pieces toward the bland member to be processed, where the fruit juice from the fruit pieces is allowed to flow through perforations on the filter member from a pulp compartment to a juice compartment while pulps are retained within the pulp compartment and the fruit juice can be poured out from an off-centered spout of the main cap member to be consumed without pulps.

12 Claims, 2 Drawing Sheets

FILTER ASSEMBLY FOR A BLENDER

BACKGROUND OF THE INVENTION

1. Field of the Invention

The present invention generally relates to the field of domestic appliances. More particularly, the present invention relates to the field of blenders, juice extractors or the like.

2. Description of the Prior Art there are prior art patents which have disclosed filters used in conjunction with blenders, whereby, the blender can be used additionally for the extraction of juice from fruits and vegetables.

the following (7) prior art patents are found to be pertinent to the field of the present invention:

1. U.S. Pat. No. 4,240,338 issued to McClean on Dec. 23, 1980 for "Citrus Juicer Attachment For Food Processor" (hereafter "the '338 McClean Patent");

2. U.S. Pat. No. 5,421,248 issued to Hsu on Jun. 6, 1995 for "Multi-Food Processor And Juice Extractor" (hereafter "the Hsu Patent");

3. U.S. Pat. No. 5,479,951 issued to McClean et al. on Jan. 2, 1996 for "Fruit And Vegetable Juicer" (hereafter "the '851 McClean Patent");

4. U.S. Pat. No. 5,636,923 issued to Nejat-Bina on Jun. 10, 1997 for "Electrical Spiral Blade Recycle Food Mixer" (hereafter "the Nejat-Bina Patent");

5. U.S. Pat. No. 5,662,032 issued to Baratta on Sep. 2, 1997 for "Juicer Attachment For A Blender" (hereafter "the Baratta Patent");

6. U.S. Pat. No. 5,690,021 issued to Grey on Nov. 25, 1997 for "Strainer Insert For Blender" (hereafter "the Grey Patent"); and 7. French Patent No. 1,145,143 (hereafter "the French Patent").

The '338 McClean Patent discloses a citrus juicer attachment for a food processor. The attachment consists of an annular trough-like member fitting within the cylindrical food processing container amounted on the base of the food processor. The trough like member has apertures in the bottom thereof to permit the passage of citrus juice while restraining passage of pulp and pips associated with the juice.

The Hsu Patent discloses a multi-food processor and juice extractor that includes a container which houses a filter assembly. The assembly is operatively connected to a shaft for rotating the assembly within the container. The food is milled within the filter assembly by a plurality of cutters integral with the assembly, and after filtering, juice is received from juice outlet.

The '851 McClean Patent discloses a fruit and vegetable juicer with a rotatable horizontal grating disc which is surrounded by a filter and a feed tube arranged above the disc. A food pusher is inserted into the tube for pressing food down on to the grating disc for grating. Pulp and juice thereby produced are thrown upwardly and outwardly, the juice passing through the filter and the pulp passing over the filter for subsequent collection.

The Nejat-Bina Patent discloses an electric spiral blade recycle food mixer which has a helical mixing blade positioned with in a perforated cylinder, and both are contained with in a housing.

The Baratta Patent discloses a juicer attachment for a blender. The juicer attachment comprises a filter with a lid. The lid has a bore into which a plunger is inserted for dislodging clogged food material around the blade member of the blender. The plunger is hollow and has an open end and a closed end. The juicer attachment also comprises a base for connecting the juicer attachment to the blender. The filter is directly connected to the base.

The Grey Patent discloses a strainer insert for a blender. The strainer insert is a cylindrical chamber with strainer openings. A mounting base is attached to the blender to which the strainer chamber is attached when in use.

The Frend Patent, as disclosed from the figures shows a filter contained within a blender.

As mentioned above, the Baratta, the Grey and the Nejat-Bina Patents have disclosed a filter used in conjunction with a blender. However, the structure of these three patents is totally different from the present invention.

The Baratta and Grey Patents have disclosed using a mounting base for retaining and connecting the filter thereto. In contrast, the present invention does not use a mounting base for connecting the filter thereto. Furthermore, none of the prior art patents have disclosed a lid which can be used for covering both the top open ends of the filter and the container.

It is desirable to provide an improved filter assembly for blenders, juice extractors or the like.

SUMMARY OF THE INVENTION

The present invention is a novel and unique filter attachment for ordinary blenders, juice extractors or the like.

It has been discovered, according to the present invention, that there are elaborate devices such as food processors and juicers in which various fruits and vegetables may be placed and grounded or blended into a liquid mixture.

It has also been discovered, according to the present invention, that such food processors and juicers are generally elaborate electric powered grinding machines rather than the more traditional common blending machine.

It has additionally been discovered, according to the present invention, that food processors and juicers have been separate appliances from ordinary blenders which are often cost prohibitive.

It is therefore an object of the present invention to provide a simple method to modify the common blender used to mix drinks and other ingredients to be used as juicer and strainer.

It is an additional object of the present invention to provide a means to use a blender to separate liquid from solid objects such as fruits and vegetables.

It is a further object of the present invention to provide an attachment to a blender which will separate the liquid in such way that it may be poured into a container such as a glass without further straining being required.

In the preferred embodiment of the present invention, the filter assembly includes a main cap member, a plunger and a hollow perforated cylindrical filter member. The main cap member has a central feeder opening and on off-center spout which is covered by a smaller cap member. The filter member is aligned with the central feeder opening and press fitted and secured underneath the main cap member. When properly fitted, the filter member is positioned within a container and surrounds the cutting blade located at the bottom of the container. A plunger is placed within the filter member through the central feeder opening. The plunger is comprised of an elongated spindle rod, an inner cap member, a spindle holder and a pusher plate. The inner cap member is slidably installed on the spindle rod and covers the central feeder opening. When fruits are fed through the central feeder opening and by using the plunger fruits can be pushed toward the cutting blade member to be processed. The pulp is then retained within the filter member while the juice is allowed to flow through the filter member and can be poured out from the spout by opening the smaller cap member.

In general, the uniqueness of the present invention is that the disclosed filter attachment does need to be retained or connected to a mounting base. Furthermore, none of the prior art patents have disclosed a lid which can be used for covering the top open ends of the filter and the container.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
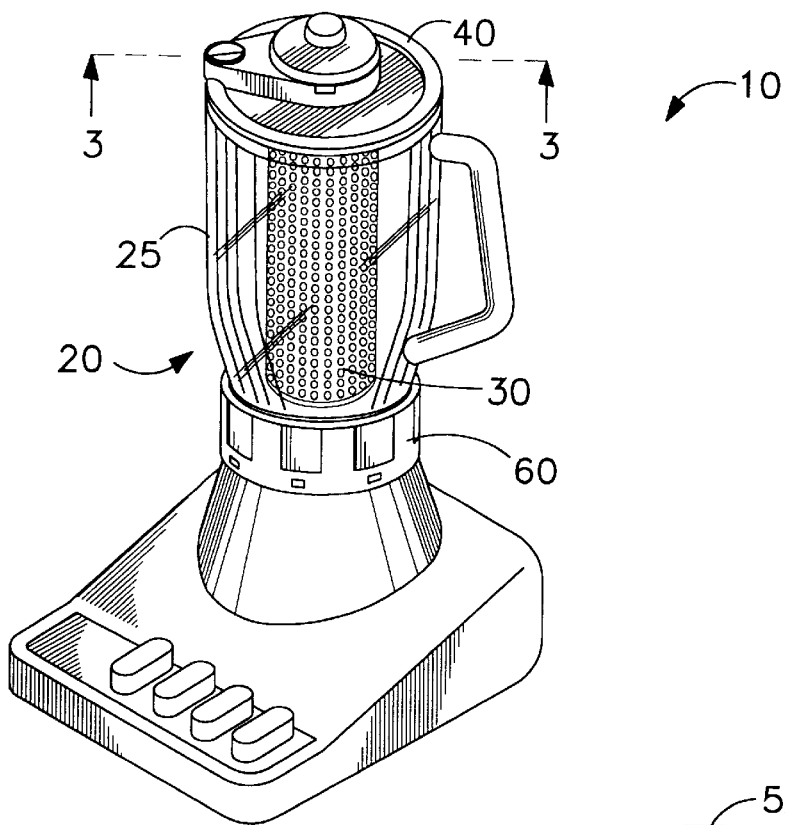
FIG. 1 is a perspective view of the present invention filter assembly installed within a conventional blender.

Referring to FIG. 1, there is shown at 10 a conventional blender used in conjunction with the present invention filter assembly 20. In conventional commercial blenders, a container 25 is threadedly installed into an internally threaded bore of a base member 60. The base member 60 has a cutting blade member 62 which connects to a motor housed in the base member 60 of the blender 10. The motor drives the cutting blade member 62 causing the blades to turn.

Figure 3:
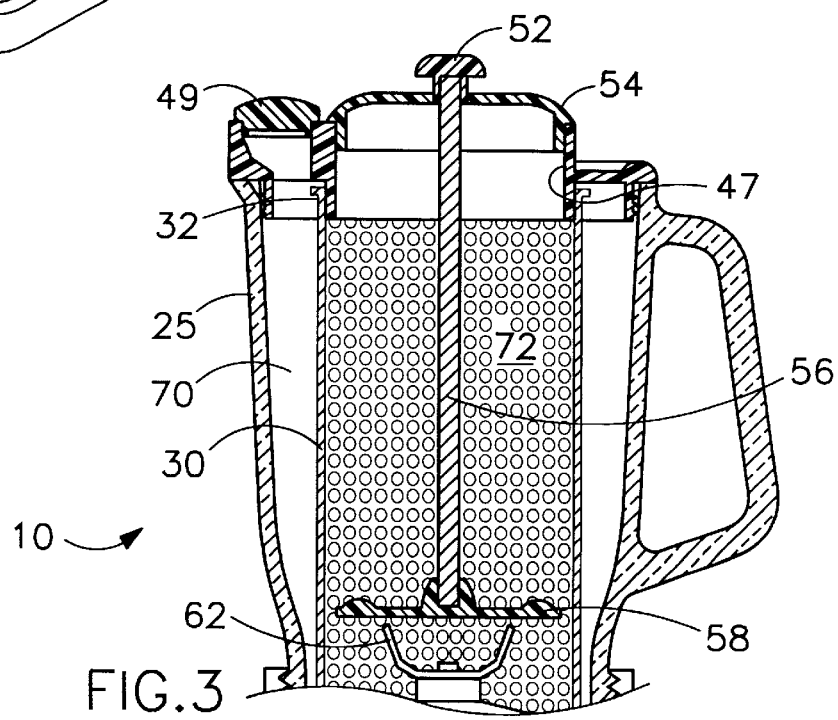
FIG. 3 is an exploded perspective view of the present invention filter assembly along with the conventional blender.
Figure 2:
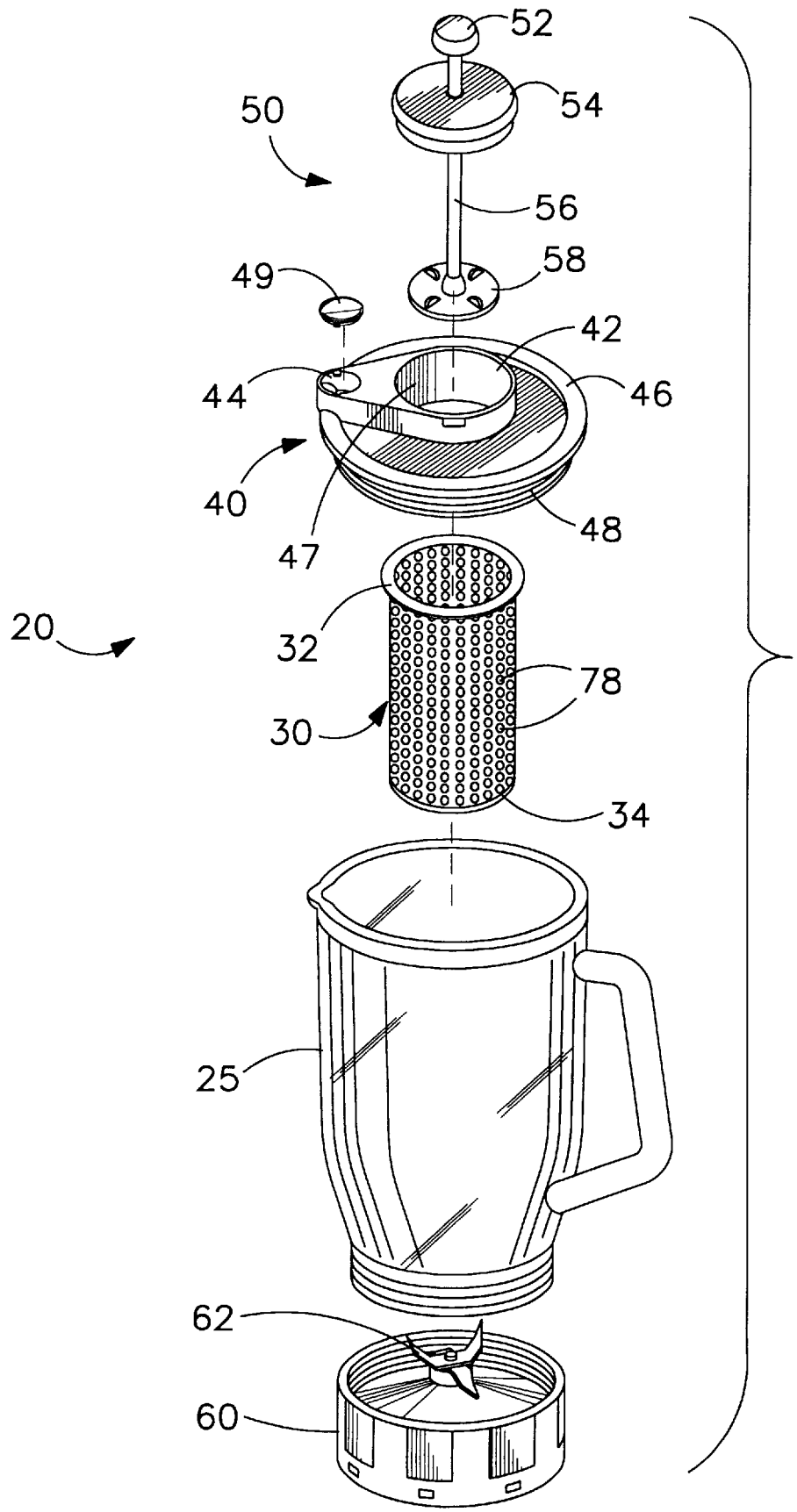
FIG. 2 is a cross-sectional view taken along line 2—2 of FIG. 1.

Referring to FIGS. 2 and 3, there is shown the filter assembly 20 which includes a filter member 30 with a main cap member 40. The filter member 30 is attached underneath the main cap member 40 and positioned within the container 25 to cover the blade member 62 and separate a space within the container 52 into a juice compartment or chamber 70 and a pulp compartment or chamber 72. The main cap member 40 has a top side 46, a bottom side 48, a central feeder opening 42 extending through from the top side to the bottom side, and an off-centered spout 44. The main cap member 40 has a cylindrical sidewall 47 which surrounds the central feeder opening 42 and extends downwardly and coaxially from the bottom side 48 of the main cap member 40. The cylindrical sidewall 47 press fits into an annular upper end 32 of the filter member 30. The off-centered spout 44 in the main cap member 40 is covered by a smaller cap member 49.

A plunger assembly 50 is inserted through the central feeder opening 42 of the main cap member 40. The plunger assembly 50 comprises a spindle holder 52, an inner cap member 54, a spindle rod 56 and a pusher plate 58. The spindle holder 52 is fixed at the upper end of the spindle rod 56 while the pusher plate 58 is fixed at the lower end of the spindle rod 56. The inner cap member 54 is slidably installed on the spindle rod 56. The pusher plate 58 is positioned within the filter member 30 such that the inner cap member 54 covers the central feeder opening 42 of the main cap member 40 (see FIG. 3).

The filter member 30 has a hollow perforated cylinder with an annular upper end 32 and a lower end 34. The perforations 78 in the filter member 30 are sized such that juice of the fruits or vegetables which are being processed, pass through the perforations of the perforated cylinder 30 into the juice compartment 70 but pulps and pips remain within the pulp compartment 72 of the perforated cylinder 30. When in use, the filter member 30 is aligned with the central feeder opening 42 and press fits underneath the main cap member 40.

The inner cap member 54 is slidable installed on the spindle rod 56 and press fits into the central feeder opening 42 such that the plunger assembly 50 remains within the filter member 30 and the pusher plate 58 is above the cutting blade member 62 located at the base member 60. When properly installed, the filter member 30 is positioned within the container 25 and surrounds the cutting blade 62 located at the base member 60 of the container 25.

Whereby, after putting fruits or vegetables through the central feeder opening 42 and then closing the opening 42 with the inner cap member 54, fruits and vegetable would remain within the filter member 30 to be processed. By pushing with the slidable rod 56, the pusher plate 58 of the plunger assembly 50 would push the fruits and vegetables toward the cutting blade member 62 to be processed. The pulp is then retained within the pulp compartment 72 of the filter member 30 while the juice is allowed to flow through to the juice compartment 70 of the filter member 30 and can be poured out from the spout 44 by opening the small cap member 49.

Defined in detail, the present invention is a blender, comprising: (a) a container having a bottom end threadedly engaged into a base which houses a cutting blade member; (b) a main cap member for covering an open end of the container and having a central feeder opening extending through from a top side to a bottom side and an off-centered spout, the main cap member further having a cylindrical sidewall surrounding the central feeder opening and partially extending downwardly and coaxially from the bottom side; (c) a hollow cylindrical filter member press-fitted to the cylindrical sidewall of the main cap member and having perforations formed thereto, the filter member disposed in the container and surrounding the blade member and separating a space within the container into a juice compartment and a pulp compartment; and (d) a plunger assembly positioned within the filter member through the central feeder opening of the main cap member, the plunger assembly including a spindle rod, an inner cap member slidably installed at an upper end of the spindle rod and covering the central feeder opening of the main cap member, and a pusher plate connected to a lower end of the spindle rod; (e) whereby when fruit pieces are placed within the pulp compartment and the pusher plate of the plunger assembly forces the fruit pieces to the cutting blade member to be processed, the perforations on the filter member allow fruit juice to flow through from the pulp compartment to the juice compartment while retaining fruit pulps in the pulp compartment, so that the fruit juice can be poured out from the off-centered spout and consumed without pulps.

Defined broadly, the present invention is a filter assembly to be used in conjunction with a blender, where the blender has a container with a bottom end threadedly installed into a base which houses a blade member, the filter assembly comprising: (a) a cap member for covering an open end of the container and having a cylindrical sidewall surrounding a feeder opening and partially extending downwardly therefrom; (b) a hollow cylindrical filter member being disposed in the container for covering the blade member and separating a space within the container into a juice chamber and a pulp chamber, the filter member having perforations formed thereto for allowing fruit juice from processed fruit pieces to flow through from the pulp chamber to the juice chamber; and (c) the hollow cylindrical filter member press-fitted to the cylindrical sidewall of the cap member and secured in position within the container; (d) whereby when the fruit pieces are placed through the feeder opening of the container and into the pulp chamber, the perforations on the filter member allow the fruit juice from the processed fruit pieces to flow through from the pulp chamber to the juice chamber while retaining fruit pulp in the pulp chamber, so that the fruit juice can be consumed without pulps.

Defined more broadly, the present invention is a filter assembly to be used in conjunction with a blender, where the blender has a container and a blade member located within a container, the filter assembly comprising: (a) a filter member positioned within the container to cover the blade member and separate the space within the container into a juice compartment and a pulp compartment where the blade member is located; (b) the filter member having filter means for allowing juice to flow from the pulp compartment to the juice compartment while preventing pulps to pass to the juice compartment from the pulp compartment; and (c) a cap member for covering the container and having means for holding the filter member in position within the container; (d) whereby when fruit pieces are placed within the pulp compartment and blended by the blade member of the blender, the filter means allows fruit juice to flow through the filter means from the pulp compartment to the juice compartment while retains fruit pulps in the pulp compartment, so that the fruit juice can be consumed without pulps.

Of course the present invention is not intended to be restricted to any particular form or arrangement, or any specific embodiment, or any specific use, disclosed herein, since the same may be modified in various particulars to relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A blender, comprising:
   a. a container having a bottom end threadedly engaged into a base which houses a cutting blade member;
   b. a main cap member for covering an open end of said container and having a central feeder opening extending through from a top side to a bottom side and an off-centered spout, the main cap member further having a cylindrical sidewall surrounding the central feeder opening and partially extending downwardly and coaxially from the bottom side;
   c. a hollow cylindrical filter member press-fitted to said cylindrical sidewall of said main cap member and having perforations formed thereto, the filter member disposed in said container and surrounding said blade member and separating a space within said container into a juice compartment and a pulp compartment; and
   d. a plunger assembly positioned within said filter member through said central feeder opening of said main cap member, the plunger assembly including a spindle rod, an inner cap member slidably installed at an upper end of the spindle rod and covering said central feeder opening of said main cap member, and a pusher plate connected to a lower end of the spindle rod;
   e. whereby when fruit pieces are placed within said pulp compartment and said pusher plate of said plunger assembly forces the fruit pieces to said cutting blade member to be processed, said perforations on said filter member allow fruit juice to flow through from said pulp compartment to said juice compartment while retaining fruit pulps in said pulp compartment, so that the fruit juice can be poured out from said off-centered spout and consumed without pulps.

2. The blender in accordance with claim 1, further comprising a small cap member for covering said off-centered spout.

3. A filter assembly to be used in conjunction with a blender, where the blender has a container with a bottom end threadedly installed into a base which houses a blade member, the filter assembly comprising:
   a. a cap member for covering an open end of said container and having a cylindrical sidewall surrounding a feeder opening and partially extending downwardly therefrom;
   b. a hollow cylindrical filter member being disposed in said container for covering said blade member and separating a space within said container into a juice chamber and pulp chamber, the filter member having perforations formed thereto for allowing fruit juice from processed fruit pieces to flow through from the pulp chamber to the juice chamber; and
   c. said hollow cylindrical filter member press-fitted to said cylindrical sidewall of said cap member and secured in position within said container;
   d. whereby when the fruit pieces are placed through said feeder opening of said container and into said pulp chamber, said perforations on said filter member allow the fruit juice from the processed fruit pieces to flow through from said pulp chamber to said juice chamber while retaining fruit pulp in said pulp chamber, so that the fruit juice can be consumed without pulps.

4. The filter assembly in accordance with claim 3, wherein said cap member further includes an off-centered spout for allowing the fruit juice to be poured out from said juice chamber of said container.

5. The filter assembly in accordance with claim 4, further comprising a smaller cap member for covering said off-centered spout of said cap member.

6. The filter assembly in accordance with claim 3, further comprising a plunger assembly which includes a spindle rod, a spindle holder fixed at an upper end of the spindle rod, a pusher plate fixed at a lower end of the spindle rod and a second cap member for covering said feeder opening of said cap member, where said plunger assembly is installed through said feeder opening such that the pusher plate forces the fruit pieces to said blade member to be processed.

7. A filter assembly to be used in conjunction with a blender, where the blender has a container and a blade member located within a container, the filter assembly comprising:

a. a filter member positioned within said container to cover said blade member and separate the space within said container into a juice compartment and a pulp compartment where said blade member is located;

b. said filter member having filter means for allowing juice to flow from said pulp compartment to said juice compartment while preventing pulps to pass to said juice compartment from said pulp compartment; and c. a cap member for covering said container and having means for holding said filter member in position within said container;

d. whereby when fruit pieces are placed within said pulp compartment and blended by said blade member of said blender, said filter means allows fruit juice to flow through said filter means from said pulp compartment to said juice compartment while retains fruit pulps in said pulp compartment, so that the fruit juice can be consumed without pulps.

8. The filter assembly in accordance with claim 7, wherein said cap member further comprises a central feeder opening extending through from a top side to a bottom side of said cap member and an off-centered spout for allowing the fruit juice to be poured out from said juice compartment of said container.

9. The filter assembly in accordance with claim 8, further comprising a smaller cap member for covering said off-centered spout of said cap member.

10. The filter assembly in accordance with claim 8, further comprising a plunger assembly which includes a spindle rod, a spindle holder fixed at an upper end of the spindle rod, a pusher plate fixed at a lower end of the spindle rod and a second cap member for covering said feeder opening of said cap member, where the plunger assembly is installed through said feeder opening such that the pusher plate forces the fruit pieces to said blade member to be processed.

11. The filter assembly in accordance with claim 7, wherein said filter means includes perforations formed on said filter member.

12. The filter assembly in accordance with claim 7, wherein said holding means of said cap member includes a cylinder sidewall partially extending downwardly therefrom, where said filter member is press-fitted to the cylinder sidewall.

* * * * *